(12) United States Patent
Tso et al.

(10) Patent No.: US 6,185,625 B1
(45) Date of Patent: *Feb. 6, 2001

(54) SCALING PROXY SERVER SENDING TO THE CLIENT A GRAPHICAL USER INTERFACE FOR ESTABLISHING OBJECT ENCODING PREFERENCES AFTER RECEIVING THE CLIENT'S REQUEST FOR THE OBJECT

(75) Inventors: Michael Man-Hak Tso, Hillsboro, OR (US); Jin Jing, Vancouver, WA (US); Robert Conrad Knauerhase, Portland, OR (US); David Alfred Romrell, Hillsboro, OR (US); Daniel Joshua Gillespie, Portland, OR (US); Bikram Singh Bakshi, Hillsboro, OR (US); Seshardi Sathyanarayan, Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/772,164

(22) Filed: Dec. 20, 1996

(51) Int. Cl.$^7$ .............................. G06F 15/16; G06F 3/00
(52) U.S. Cl. ...................... 709/247; 709/203; 709/217; 345/347
(58) Field of Search ................ 395/200.31, 200.32, 395/200.33, 200.47, 200.48, 200.49, 200.76, 200.77; 709/201–203, 217–219, 246–247; 345/347, 352

(56) References Cited

U.S. PATENT DOCUMENTS

| | | | |
|---|---|---|---|
| 5,373,375 | 12/1994 | Weldy | 358/523 |
| 5,517,612 | 5/1996 | Dwin et al. | 395/166 |
| 5,544,320 | 8/1996 | Konrad | 395/200.09 |
| 5,673,322 | * 9/1997 | Pepe et al. | 380/49 |
| 5,684,969 | 11/1997 | Ishida | 395/342 |
| 5,701,451 | * 12/1997 | Rogers et al. | 707/1 |

(List continued on next page.)

OTHER PUBLICATIONS

"MessagePad Solutions for Sales Professionals," Apple Computer, pp. 1–12, May 1995.*

Berners–Lee, T., et al., RFC 1945, Network Working Group, pp. 1–7 and 22–25, May 1996.*

Armando Fox and Eric A. Brewer, "Reducing WWW Latency and Bandwidth Requirements by Real–Time Distillation," Fifth International World Wide Web Conference, May 6–10, 1996.

Armando Fox et al., "Adapting to Network and Client Variability via On–Demand Dynamic Distillation," University of Cal. at Berkeley, Sep. 1996.

*Primary Examiner*—Zarni Maung
*Assistant Examiner*—Andrew Caldwell
(74) *Attorney, Agent, or Firm*—Kenyon & Kenyon

(57) ABSTRACT

A system for enhancing data access over a communications link is disclosed. In accordance with a particular embodiment, a system for retrieving an object over a computer network includes a network client with a browser for rendering an object to a user and a user interface enabling the user to establish an encoding preference. A remote scaling server is coupled between the network client and the computer network, and includes a remote proxy and an encode service provider. The remote scaling server is configured to request a user-specified encoding preference from the network client, retrieve an object from the computer network using the remote proxy, encode the object using the encode service provider in accordance with the requested user-specified encoding preference, and transmit the encoded object to the network client using the remote proxy. The disclosed system thus enables users to dynamically influence the trade-off between quality of content and download speed.

33 Claims, 10 Drawing Sheets

U.S. PATENT DOCUMENTS

| | | | |
|---|---|---|---|
| 5,706,434 | | 1/1998 | Kremen et al. .................. 395/200.09 |
| 5,724,556 | | 3/1998 | Souder et al. ........................ 395/500 |
| 5,727,159 | * | 3/1998 | Kikinis ............................ 395/200.76 |
| 5,742,768 | * | 4/1998 | Gennaro et al. ..................... 709/218 |
| 5,742,905 | * | 4/1998 | Pepe et al. ............................ 455/461 |
| 5,764,235 | | 6/1998 | Hunt et al. ............................ 345/428 |
| 5,768,510 | | 6/1998 | Gish ................................ 395/200.33 |
| 5,805,735 | | 9/1998 | Chen et al. ............................ 382/239 |
| 5,918,013 | * | 6/1999 | Mighdoll et al. .................... 709/217 |
| 5,953,506 | * | 9/1999 | Kalra ..................................... 709/231 |
| 5,991,816 | * | 11/1999 | Percival et al. ....................... 709/247 |
| 5,996,022 | * | 11/1999 | Krueger et al. ....................... 709/247 |
| 6,018,343 | * | 2/2000 | Wang et al. .......................... 345/356 |
| 6,049,821 | * | 4/2000 | Theriault et al. .................... 709/203 |
| 6,076,109 | * | 6/2000 | Kikinis ................................. 709/228 |
| 6,088,803 | * | 7/2000 | Tso et al. ............................. 713/201 |
| 6,101,328 | * | 8/2000 | Bakshi et al. ......................... 717/11 |

* cited by examiner

SCALING PROXY SERVER SENDING TO THE CLIENT A GRAPHICAL USER INTERFACE FOR ESTABLISHING OBJECT ENCODING PREFERENCES AFTER RECEIVING THE CLIENT'S REQUEST FOR THE OBJECT

BACKGROUND OF THE INVENTION

The present invention relates generally to the field of data communications for personal computers (PCs), and in particular to a system for enhancing data access over a communications link.

The Internet is quickly becoming the preferred data communications medium for a broad class of computer users ranging from private individuals to large multi-national corporations. Such users now routinely employ the Internet to access information, distribute information, correspond electronically, and even conduct personal conferencing. Indeed, an ever-growing number of individuals, organizations and businesses have established a presence on the Internet through "web pages" on the World-Wide Web (WWW).

At the same time that the Internet's popularity has been growing, the trend in personal computer design has been towards increased portability. This trend is best evidenced by the rapid growth in popularity of so-called "notebook" or "laptop" computers. Unfortunately, while PCs are becoming both more powerful and more portable, advances in communications infrastructure have not kept pace.

A primary limitation on the ability of personal computers to exploit the Internet to full benefit is a lack of sufficient communications bandwidth. Similar problems may be caused by such conditions as high network traffic, even for high-speed Internet access lines. Outside of an office environment, for example, PCs typically connect to the Internet via POTS (Plain Old Telephone Service) or wireless modems at speeds ranging from 9.6 to 14.4 kbps. Such speeds are substantially lower than typical office LAN (Local Area Network) bandwidths. This limited data communications capability translates into very long user-visible latencies when users interact with the Internet using such technologies.

Communications bandwidth limitations also cause problems for users who access the Internet in a variety of ways depending upon where they are physically located. It is quite common for a user to have more than one computer from which he or she accesses the Internet, such as an office PC, a home PC and a mobile PC for travel. Alternatively, a user may employ a single mobile PC to access the Internet from multiple locations, including office, home or remote sites. Such clients may become frustrated by differences in access speeds as they move among these various work environments, as there may be dramatic differences in the time required to access the exact same content given the widely-disparate communications bandwidths available (e.g., 10 Mb over an office LAN v. 9.6 kb over a modem). Such users typically are not tolerant of poor data access times, demanding comparable performance regardless of where and how they happen to be accessing the Internet.

Slow data communications speeds are especially problematic for the mobile and home computer industries, since available content is typically becoming richer in time frames measured in terms of weeks to months, while mobile and home computer bandwidths are typically getting broader in time frames measured in terms of years to decades. In order to remain competitive, it is desirable that mobile and home computers maintain application equivalence with office desktop PCs.

In view of this challenge, the mobile and home computer industries have developed a number of approaches for dealing with the problem of slow data communications. One such method is to use a text-only browser; that is, users are simply unable to download data other than text. While this method certainly reduces user-visible latencies by avoiding richer data types such as images and video, it also diminishes the value of most Web pages and significantly underuses the advanced media capabilities of PCs. The end result is decreased user satisfaction.

Another approach is for content providers to create content in low-quality, non-rich formats. Such content may be represented using substantially less data than high-quality, rich formats, thus shortening the time required for transmission to a user. This method, however, presents a user site with the Hobson's choice of decreased content quality for all of its users (including those with access to high-bandwidth connections) or intolerable access speeds for users with low-bandwidth connections. Since Web sites must compete with other media industries, such as television, for the attention of users, today most sites are choosing high-quality, rich content. The result is that low-bandwidth connections are becoming increasingly undesirable, resulting in many rich content Web sites creating and maintaining multiple versions of objects offering varying degrees of resolution from which the user must choose.

Yet another approach is data compression. Traditional data compression techniques involve compressing data at the network or packet level. Examples include modem compression (such as V.42) and PPP/IP header compression. Such techniques are by necessity non-lossy because they lack information about the data being compressed. Compression rates are generally no more than 2× end-to-end for all compression algorithms combined, being limited by the fact that compressing already-compressed data is largely ineffective. This is especially true for the media datatypes often used on the Web, such as video, audio and image. Content containing these rich datatypes are usually stored in compressed format already, meaning traditional compression techniques achieve substantially less than the 2× compression rate.

None of the foregoing approaches provide a satisfactory solution to the problem of providing users with fast access to the rich content available over computer networks such as the Internet.

SUMMARY OF THE INVENTION

According to an embodiment of the present invention, a system for retrieving an object from a computer network includes a network client with a browser for rendering data to a user. A remote scaling server is coupled between the network client and the computer network, and includes a remote proxy, an encode manager, and one or more encode service providers. The remote scaling server is configured to retrieve an object from the computer network using the remote proxy, encode the object using an encode service provider, and transmit the encoded object to the network client using the remote proxy.

In other embodiments, an encode service provider may be used to selectively encode or scale an object based on a predetermined characteristic thereof, such as a datatype, making it possible to achieve compression rates substantially greater than the 2× rate achieved by traditional compression techniques without negatively affecting software that ultimately processes the compressed data. Such higher compression rates may be achieved by reducing the quality of a picture and/or by using compression techniques tuned for specific datatypes. For example, representing certain types of images, such as photographic images, using JPEG or fractal compression algorithms may result in a 10× improvement in compression rate over the popular GIF format. Moreover, such datatype-specific compression techniques may be adaptive to a particular client's capabilities, including display resolution, available network bandwidth, connection quality (wired versus wireless/radio), and central processing unit (CPU) capability (for handling decompression). Thus, the quality of the user experience may vary with client capability, all without having to specialize content, Web server software or client software.

DETAILED DESCRIPTION

Figure 1:
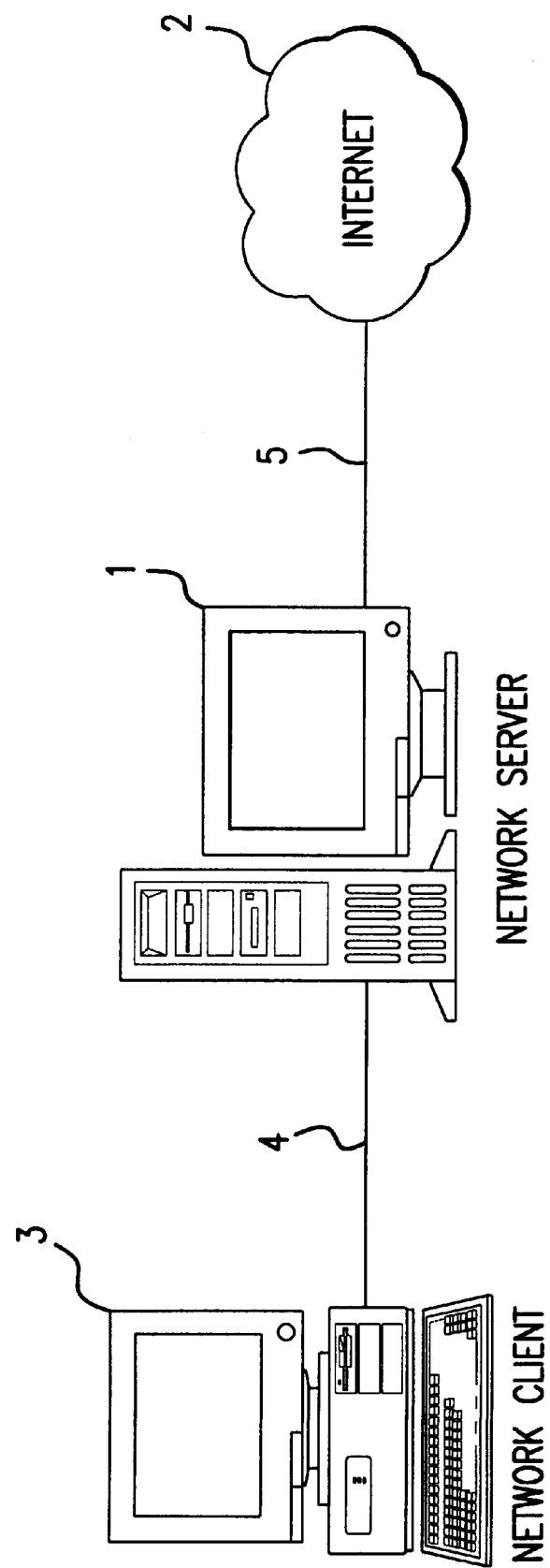
FIG. 1 is a schematic diagram illustrating an environment in which embodiments of the present invention may be applied.

Given the drawbacks of known approaches, there is a need for providing bandwidth-constrained computer users with fast access to the full range of rich data content available on computer networks such as the Internet. Embodiments of the present invention satisfy that need, reducing the gap between the richness of available content and the ability of bandwidth-constrained personal computers to provide users with access to that content. Such embodiments may be particularly useful for improving the performance of mobile or home PCs having limited bandwidth available for data communications. In such cases, substantial performance improvements are possible, significantly reducing user-visible latencies. Moreover, embodiments of the present invention may be configured to be fully backwards compatible with today's popular Internet browsers, Web servers, and existing content types.

Like some prior approaches, embodiments in accordance with the present invention are founded on the theory of trading quality for performance. User-visible latencies may be reduced by scaling (encoding) content to decrease the quantity of data that must be transmitted. As is explained more fully below, scaling may be performed by a caching network proxy using one or more of the following methods:

reduction of content dimension;
reduction of content quality through lossy compression, such as lower quality, less colors, or partial conversion of an image object to text or an outline;
translation of content to a more efficient representation format; and
combinations of the foregoing.

Numerous techniques for scaling various types of data are well-known in the art, and the present invention is not dependent upon the use of any particular technique. Nor is the present invention intended to be limited according to any technique discussed below for purposes of illustrating features of certain embodiments. In addition to scaling, user-visible latencies may be reduced by caching multiple versions of content, which is a difficult and resource-intensive task using existing technology.

Embodiments in accordance with the present invention are directed to providing a flexible system for enhancing the transfer of data from remote networks, such as the Internet, to computers having communications and/or presentation restrictions including, for example, limited communications bandwidth, congested communications lines, or limited visual or audio display capabilities. A significant problem addressed by embodiments in accordance with the invention is that content authored for a particular type of client (for example, in terms of display capability or connection speed) does not always work well for other types of clients. In other words, content that is "rich" enough (high image quality) for clients accessing the network over a relatively high-speed LAN may download too slowly for clients accessing the network over a relatively slow-speed POTS connection. Conversely, content that is optimized for fast POTS downloading may appear uninteresting (small, grainy images) to LAN clients who have come to expect richer content. To compound this problem, the population of network clients is extremely diverse. Some clients have fast data links, while others have data links that may be as much as 100× slower. Similarly, some clients have large video displays with extensive color capability, while others have small video displays with little or no color capability. A system according to an embodiment of the present invention may automatically adjust the quality of the data access experience based on these varying client capabilities, enabling content providers to author for the richest clients yet have their content automatically scaled for any number of clients with lesser capabilities. In this way, clients are ensured of increased benefit and enjoyment. In addition, users may be given the option of selecting the kind of experience they want by controlling the tradeoff between download time and richness of the downloaded content.

Certain embodiments of the invention described below use a "network proxy" to provide content to a client. Network proxies are generally known in the art, as described in Ian S. Graham, *HTML Source Book: A Complete Guide to HTML 3.0* (2d ed. Wiley Computer Publishing 1996), incorporated herein by reference. A network proxy, or proxy server, is typically used in conjunction with so-called "firewall" software to protect a LAN from unauthorized access over the Internet. A firewall, typically installed on a gateway computer that links the LAN to the external world, restricts externally-originated TCP/IP (Transmission Control Protocol/Internet Protocol) packets from entering a local area network, thereby protecting the LAN from hazards such as unauthorized access and viruses. However, the firewall also prevents network users from directly accessing external resources such as the Web. Network proxies are often used to address this shortcoming. See Graham, at 403.

Network proxies are usually configured to have free access to both internal LAN resources and external resources, and can safely pass data back and forth across the firewall. Users may then be given safe, though indirect, access to Web resources by configuring the user's Web browser to reference the network proxy instead of external target servers. When the Web browser is used to retrieve information from outside the firewall it sends a request to the network proxy, which then completes the request and returns the result to the requester. Id.

While the firewall/network proxy architecture effectively shields a LAN from external hazards, the two-stage data access procedure is often relatively slow. It is therefore common for a network proxy to cache retrieved files. For example, the first time that a document residing on the Web is requested, the network proxy retrieves the document and forwards it to the browser for presentation to the user, but also retains a copy of the document in its own local memory. If the same or another user makes a subsequent request for that same document, the network proxy returns the locally-cached copy of the document instead of re-retrieving it from the Web. Id. at 403–404. An example of a cache for use by a network proxy was described in Anawatt Chankhunthod et al., "A Hierarchical Internet Object Cache," Nov. 6, 1995 (available from the Computer Science Dept. of the University of Southern California), incorporated herein by reference.

Another example of a network proxy is "GloMop," developed at the University of California-Berkeley, which uses a network proxy to reduce latency by scaling images to thumbnails before transmitting them to users. See Armando Fox and Eric A. Brewer, "Reducing WWW Latency and Bandwidth Requirements by Real-Time Distillation" (available from the University of California-Berkely), incorporated herein by reference. As described, GloMop lacks the ability to accommodate more than a handful of users concurrently because there is no facility for selective scaling or background compression. In addition, image maps tend to break when scaled to thumbnails. Another problem is that GloMop does not cache scaled images, meaning the same image may be scaled over and over again in response to multiple requests. Nor does GloMop employ stream-based processing, meaning users must wait for GloMop to scale an entire image before beginning to perceive any portion of an image, thus limiting the responsive "feel" of the system. Finally, GloMop requires the installation of new client software (specialized browsers). In view of these and other problems, GloMop is not a commercially-deployable system.

Referring now to FIG. 1, which illustrates an environment in which an embodiment of the present invention may be advantageously applied, a network server 1 manages the transfer of data from the Internet 2 to a network client 3. Network client 3 may be any computer having suitable data communications capability.

Network client 3 communicates requests for information to, and receives information from, network server 1 over a client/server communications link 4. Client/server communications link 4 may comprise, for example, a so-called "slow network" using, for example, POTS dial-up technology or wireless connections. Alternatively, client/server communications link 4 may comprise a so-called "fast network," such as a LAN or WAN (Wide Area Network), which is capable of operating at much higher speeds than are possible with slow networks. Combinations of these access methods are also possible. For example, network client 3 may use a POTS or wireless dial-up connection to a modem bank maintained by an ISP (Internet Service Provider), which is in turn connected to network server 1 over a LAN.

Figure 2:
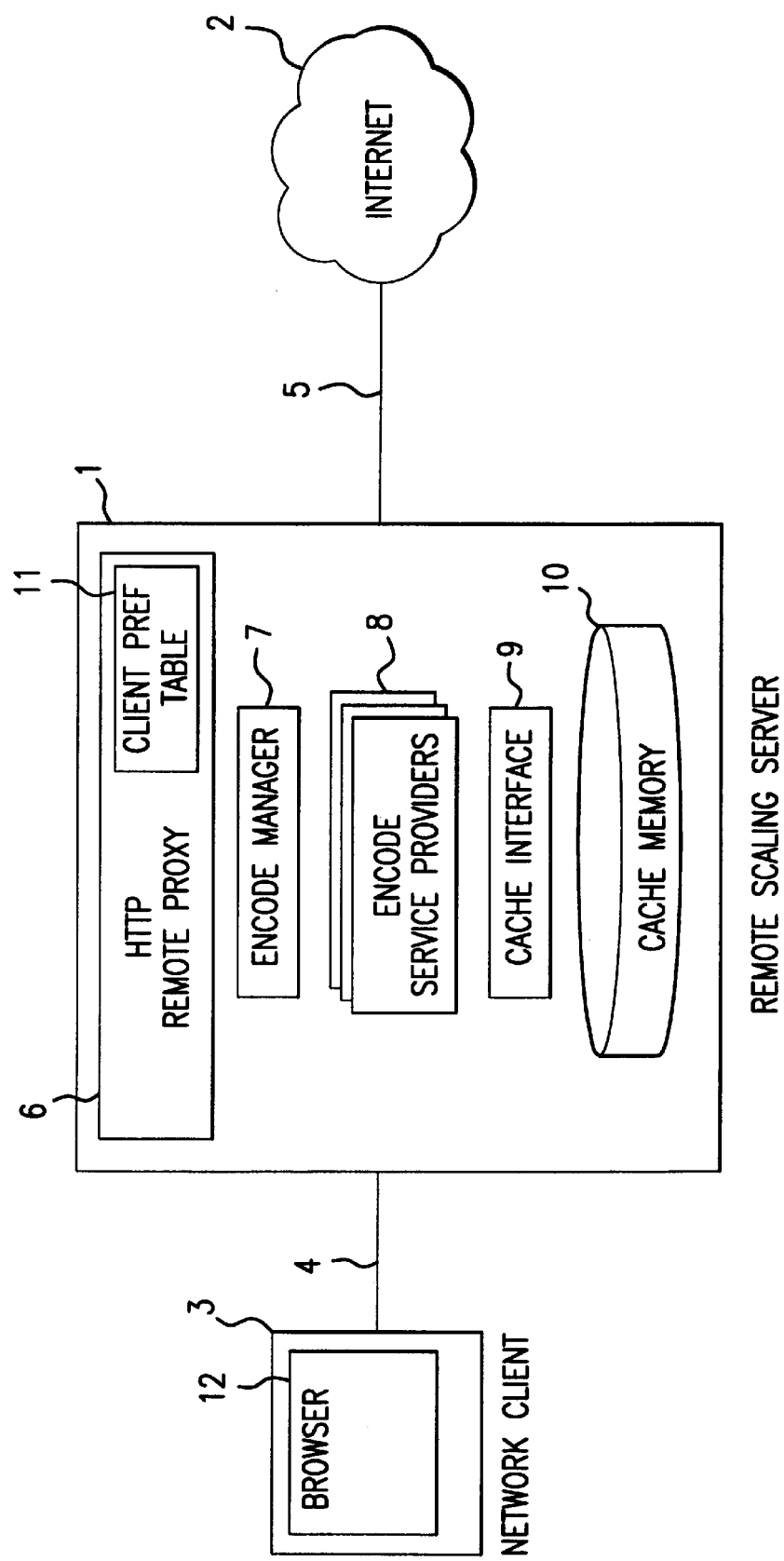
FIG. 2 is a schematic diagram illustrating an embodiment of the present invention directed to a non-enabled network client.

Referring now to FIG. 2, in a first embodiment of the present invention network client 3 accesses Internet 2 through a remote scaling server 1. Remote scaling server 1 may be implemented, for example, as part of a network server, as a stand-alone computer in communication with a network server, or as a distributed system of computers. Remote scaling server 1 may be coupled, for example, to an ISP's network, a corporate network, or anywhere on Internet 2, and provides multiple users with a means to obtain content on Internet 2.

Remote scaling server 1 includes an HTTP (HyperText Transfer Protocol) remote proxy 6, capable of accessing Internet 2 over a server/network communications link 5. As will become apparent from the following description, HTTP remote proxy 6 is markedly different from known network proxies, which generally are little more than a conduit for requests to, and replies from, external Internet resources. By contrast, the HTTP remote proxy 6 not only examines such requests and replies, but may act on commands in the requests by, for example, determining whether or not to scale content. Also unlike existing network proxies, HTTP remote proxy 6 is capable of changing content received from Internet 2 prior to returning it to a requesting network client 3 by, for example, scaling the content.

An encode manager 7 is coupled to HTTP remote proxy 6. Encode manager 7 manages the compression of data to be transmitted from remote scaling server 1 to network client 3. To this end, encode manager 7 controls one or more encode service providers 8 which may be used to selectively scale content based on a predetermined characteristic thereof. For example, in one embodiment, each encode service provider 8 may include the capability to compress and/or scale a different type of data content, such as image, video, or HTML (HyperText Markup Language). Other examples of such predetermined selection criteria which may be used to selectively scale content include presentation capabilities of network client 3, such as an ability to playback sound recordings, a quality of sound supported (e.g., mono versus stereo), and resolution, dimensions and/or color support of a user display device; CPU and/or memory capacity; speed and/or quality of client/server communications link 4; and/or user-selected preferences. The present invention is not limited in scope in this respect.

In this embodiment, remote scaling server 1 also includes a server-side cache memory 10 managed by a server-side cache interface 9. Server-side cache memory 10 may be used to store both original and compressed/scaled versions of content for later transmission to network client 3 without the need to re-retrieve the content from Internet 2 or to re-compress the content.

Remote scaling server 1 is coupled to network client 3 by a client/server communications link 4. Network client 3 includes a browser 12, such as the Netscape Navigator v.3.0 browser (although the invention is not limited in this respect), which manages the presentation of data to a user. In this embodiment, network client 3 is "non-enabled," meaning no specialized decoding software is preloaded on network client 3.

Encode manager 7 serves as a relatively simple, uniform interface to HTTP remote proxy 6, and may provide an API (Application Programming Interface) for encoding data received by HTTP remote proxy 6. Encode manager 7 manages one or more encode service providers 8 that are accessed through a common SPI (Service Provider Interface). In this particular embodiment, encode manager 7 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995) (incorporated herein by reference), enables encode service providers 8 to be dynamically added to the system to provide new features and/or better scaling algorithms, while at the same time not requiring changing or retesting other software components in the system. This feature is especially beneficial where remote scaling server 1 also interacts with "enabled" network clients equipped with specialized decoding software. It should be noted that some of the features of encode manager 7 described below may be inapplicable to the non-enabled client embodiment of FIG. 2; however, remote scaling server 1 may advantageously be configured flexibly enough to process requests from both non-enabled and enabled network clients.

Like encode manager 7, server-side cache interface 9 is preferably modeled after a Get/Set interface. Server-side cache memory 10 essentially "owns" all cached objects, in that it manages the properties and storage of the objects and may invalidate any non-locked object at any time; however, the actual format of any given cached object is known only by encode service manager 7 and its associated encode service providers 8. Thus, for data integrity and compression efficiency purposes, all accesses to server-side cache memory 10 in this embodiment are done through encode manager 7.

In this particular embodiment, server-side cache interface 9 may include the following calls:
 CreateEntry(URL, &Entry, . . . );
 GetEntry(URL, &Entry);
 CreateStream(Entry, &StreamEntry, . . . );
 GetStream(Entry, &StreamEntry, . . . );
 CloseEntry(Entry);
 CloseStreamEntry(StreamEntry);
 GetProperties(Entry, &Properties, . . . );
 SetProperties(Entry, &Properties, . . . );
 Read(StreamEntry, &OutStream, . . . );
 Write(StreamEntry, &InStream, . . . ).

Unlike existing cache memories, server-side cache interface 9 and server-side cache memory 10 enable maintenance of multiple representations of a given cached object, with descriptive information about each representation included in server-side cache memory 10. In addition, server-side cache interface 9 and server-side cache memory 10 serve as a synchronization point for multi-threaded accesses to cached objects. It should be noted that the present invention is not limited to any particular configuration for server-side cache interface 9 and/or server-side cache memory 10. Indeed, functionality attributed to these components in the various embodiments described herein may be readily implemented in other system components.

The CreateEntry( ) call creates and returns a cache entry for a specified hypertext object. This call also creates an entry stream for an original version of the hypertext object. Similarly, the GetEntry( ) call obtains a cache entry for a hypertext object already existing in cache memory 10. Both the CreateEntry( ) and GetEntry( ) calls set locks on associated cached objects until a CloseEntry( ) call is invoked. Once a lock is set, the cached object will not be replaced or invalidated by cache interface 9, permitting one or more encode service providers 8 to safely perform any required cache operations, such as object retrieval and/or storage.

After a cache entry is created or opened by a CreateEntry( ) or GetEntry( ) call, the CreateStream( ) or GetStream( ) calls may respectively create or open an extra stream entry for the cached object. Each extra stream entry is associated with a different scaled version of the hypertext object, which may be retrieved or appended to by an encode service provider 8. Stream-based processing of cached objects makes it possible for remote scaling server 1 to begin transmitting a scaled version of a hypertext object to a requesting network client 3 even while encode service provider 8 is appending additional scaled content to that same version. Advantages of this stream-based processing include reducing user latency through incremental painting of objects and avoiding unnecessary idle time on client/server communications link 4, thereby providing users with a more responsive "feel."

The GetProperties( ) and SetProperties( ) calls retrieve and store information about cached objects, including information maintained by encode service provider 8 used to determine scale properties and scaling status of a cached object. Encode service provider 8 may use such information to determine current compression progress for scaled data access and staged refinements.

The Read( ) call reads data from a specified cached object data stream. For example, encode service provider 8 may invoke this call and tunnel stream data through HTTP remote proxy 6 directly to network client 3. The Write( ) call caches data from a new HTTP data stream. This call will append an incoming data stream received from, for example, a Web server or encode service provider 8, to an opened cache stream which may be concurrently read using the Read( ) call.

In the present embodiment, encode manager 7 includes the following calls:
 GetObject(URL, InParams, &OutParams, &OutStream, . . . );
 GetScaledObject(URL, InParams, &OutParams, &OutStream, Stage, . . . );
 PutObject(URL, InParamStruct, &InStream, &OutParams, &OutStream, . . . ).

As detailed below, encode manager 7 uses these calls to manage the provision of requested content to network client 3.

The GetObject( ) call is used to service non-enabled client requests, and returns a non-scaled (original) version of the specified hypertext object that can be readily rendered by existing browsers. In this embodiment, remote scaling server 1 assumes that each HTTP request has a unique thread that may be blocked until the request is satisfied. Accordingly, the GetObject( ) call will block until it either returns the requested data stream or indicates failure with a cause (e.g., object does not exist, refinement not available). This ability to return a so-called standard hypertext object is advantageous for compatibility reasons, enabling embodiments of the present invention to be used with existing browsers that do not include support for scaling, and enabling users to selectively retrieve original versions.

The GetScaledObject( ) call is similar to GetObject( ), and is also used to request an object from server-side cache memory 10; however, it adds support for requesting a particular version, or quality rendition, of that object. Unlike traditional caching proxies, encode service providers 8 can use server-side cache memory 10 to store several different versions of an object to support clients with different communications and/or presentation capabilities. Thus, an additional "Stage" parameter is used to indicate which version of the cached object is to be returned to network client 3. An encode service provider 8 may use this parameter to request a version of a cached object having a default scaled quality, a refinement to a better-quality version, or the original non-scaled version.

In this embodiment, when network client 3 requests a hypertext object, HTTP remote proxy 6 uses either the GetObject( ) or GetScaledObject( ) call (depending on if network client 3 is capable of receiving scaled datatypes) to retrieve the hypertext object from encode manager 7. If the hypertext object is not found, encode manager 7 uses the CreateEntry( ) call to create an entry (in effect, a placeholder) in server-side cache memory 10 for the new object. The new entry is returned to HTTP remote proxy 6, which requests the hypertext object from Internet 2. As a data stream for the hypertext object is returned, HTTP remote proxy 6 calls encode manager 7 using the PutObject( ) call, passing into this call the new entry and the handle to the data stream to be placed into the entry. Encode manager 7 selects an appropriate encode service provider 8 based on the content type of the data stream. In this context, the term content type encompasses a datatype, an HTTP MIME (Multipurpose Internet Mail Extensions) type, a content format, and so on. This encode service provider 8 uses a separate thread to read the incoming data stream, scale it, and place it within the entry of server-side cache memory 10. The current thread immediately returns to HTTP remote proxy 6, which once again calls GetScaledObject( ) (or GetObject( )). This case will always result in a cache hit. This thread then works simultaneously with the separate thread in the PutObject( ) to tunnel data (either original or compressed) from remote scaling server 1 to network client 3.

Multiple-thread processing improves the efficiency of the present embodiment by not waiting for a hypertext object to be received in its entirety by HTTP remote proxy 6, or added in its entirety to server-side cache memory 10, before beginning to send the object to network client 3. Another benefit of multiple-thread processing is that encode manager 7 may efficiently process requests for the same hypertext object from multiple network clients 3. The hypertext object need only be retrieved from Internet 2 once, and appropriate versions may be transmitted to such multiple network clients 3 concurrently. It should be noted, however, that embodiments of the present invention may be implemented without multiple-thread processing.

To further illustrate the general operation of the embodiment illustrated in FIG. 2, assume a user of network client 3 wishes to access a particular Web page, or URL (Uniform Resource Locator), on Internet 2. Further assume that the desired URL resides on, or is accessible through, remote scaling server 1. Network client 3, via browser 12, transmits an HTTP request for the hypertext object to remote scaling server 1 over client/server communications link 4. Where browser 12 normally accesses Internet 2 through a proxy, browser 12 is configured to pass user requests through remote scaling server 1 via browser's 12 standard proxy configuration procedures. As is well known in the art, browser 12 may actually transmit a plurality of additional HTTP requests corresponding to each of various distinct hypertext objects that may be embedded in the Web page. In such a case, remote scaling server 1 processes each such request in the manner described below.

According to this embodiment, HTTP remote proxy 6 is capable of distinguishing between a non-enabled network client and an enabled network client. In one embodiment, this may be accomplished using a private protocol to transmit content requests from an enabled network client to remote scaling server 1, so that the use of some other communications protocol indicates the network client is non-enabled. This method of sending a special protocol in each request to HTTP remote proxy 6 represents an improvement over a registration type process. The overhead involved in making the enabled/non-enabled determination on a per request basis is relatively small, while providing a significant advantage because it addresses the situation for HTTP remote proxy 6 where a first network client disconnects and a second network client, likely with different communications and/or presentation capabilities, reconnects using the same IP address.

Upon determining that network client 3 is non-enabled, HTTP remote proxy 6 may record the IP address of network client 3 in a client preference table 11 maintained in a local data store (client preference table 11 may improve performance of this or other embodiments, but is by no means required in order to achieve substantial benefit from the present invention). HTTP remote proxy 6 then determines whether or not to scale the content to be returned to network client 3 by default based on the speed of client/server communications link 4.

Link speed may be determined in a variety of ways. For example, HTTP remote proxy 6 may estimate the link speed by sampling the rate of one or more prior transfers of data between itself and network client 3. Assuming no prior interactions between HTTP remote proxy 6 and network client 3, HTTP remote proxy 6 may estimate the link speed from this first request. Another possible method involves measuring the time is takes a "ping" sent from HTTP remote proxy 6 to network client 3 to return to HTTP remote proxy 6. Regardless of the particular method used, HTTP remote proxy 6 may store the derived link speed in client preference table 11 in an entry indexed by the IP address of network client 3. If the derived link speed indicates a relatively slow communications link, HTTP remote proxy 6 may determine that all content to be transmitted to network client 3 should be scaled by default. Conversely, a relatively fast communications link may cause HTTP remote proxy 6 to determine that scaling would not produce sufficient benefit to justify its cost in resource usage. Either way, HTTP remote proxy 6 records this determination in client preference table 11. In one embodiment, HTTP remote proxy 6 updates client preference table 11 on an ongoing basis to adapt to changing conditions, such as increased congestion on client/server communications link 4.

HTTP remote proxy 6 then passes the hypertext object to encode manager 7 along with an indication of whether to send network client 3 an original or scaled version. Upon being invoked, encode manager 7 first calls cache interface 9 with the requested hypertext object to determine whether a copy of the required version already resides in server-side cache memory 10. For purposes of illustration, assume no entry exists in server-side cache memory 10 for the requested hypertext object. HTTP remote proxy 6 then invokes a call to retrieve the hypertext object from Internet 2 over server/network communications link 5. Assuming the hypertext object exists, HTTP remote proxy 6 begins receiving an HTTP data stream representing the hypertext object. HTTP remote proxy 6 passes the handle for this incoming data stream to encode manager 7.

Encode manager 7 dynamically determines the content type for the data stream (e.g., image/jpeg, image/gif, video/mpeg) by interrogating a MIME type in the content-type header record that appears at the beginning of the incoming HTTP data stream. In this embodiment, encode manager 7 compares the MIME type against a list of supported MIME types it maintains in a table (not shown) stored in a local data store. Each entry in the table associates a particular encode service provider 8 with a supported MIME type. In this embodiment, the table is updated each time an encode service provider 8 is loaded so that encode manager 7 contains information regarding which content types may be scaled.

In this embodiment, encode manager 7 initiates creation of a scaled version of a received hypertext object regardless of whether the particular network client 3 which requested the hypertext object is to receive an original or a scaled version. Where network client 3 is to receive the original version, the block of data is first received from Internet 2 and passed unmodified to network client 3 in a streaming fashion. Compression of this block of data may then be done in background. Nevertheless, it is desirable to have a scaled version of the hypertext object available in server-side cache memory 10 for subsequent requests by the same network client 3 or a request by different network clients 3.

According to this embodiment, if a match for the MIME type of the incoming data stream is found in the table of supported MIME types, the HTTP stream handle is given to the appropriate encode service provider 8. Encode service provider 8 determines whether it is desirable, from an efficiency standpoint, to scale the data stream. To do this, encode service provider 8 may look at other information pertaining to the incoming data stream, such as the content length (from the HTTP header) or whether the content is already compressed (for example, from a GIF image header). Another factor which might indicate whether to scale the incoming data stream includes whether the hypertext object is designated non-cacheable in view of its volatility. Scaling and caching such data is generally not desirable because a subsequent request for the original version would likely return outdated content. Encode service provider 8 may also obtain information about the current load on HTTP remote proxy 6 in terms of, for example, CPU usage, disk capacity, or other resource availability. Another factor that may be considered is the number of queued compression requests waiting to be processed. Yet another factor is the resource-intensiveness of the required compression algorithm. For example, fractal compression is very resource-intensive, and may only be desirable during low-load conditions. For this qualification operation, it may be desirable to read more of the data stream into encode service provider 8.

In an advantageous feature of the present embodiment, non-enabled network client 3 may optionally be provided the ability to actively control the trade-off between download time and content quality by selecting whether or not to scale content and/or the extent of such scaling. To provide this ability, HTTP remote proxy 6 may embed additional instructions at the beginning of the HTML header for the requested URL prior to transmitting the associated data stream to network client 3. These embedded instructions may be implemented, for example, as JavaScript codes, VB Script codes or Java Applet codes. As browser 12 of network client 3 receives the data stream, the embedded instructions will automatically execute so long as browser 12 is equipped to support them. For example, if the embedded instructions are implemented as JavaScript codes, browser 12 may be a JavaScript-enabled browser such as a Netscape Navigator v.2.0 or above browser, or an Internet Explorer v.3.0 or above browser. If browser 12 is not equipped for such HTML scripting, the embedded instructions will not interfere with the browser's 12 normal processing, as such browsers 12 are typically configured to ignore any data they cannot interpret.

Figure 3:
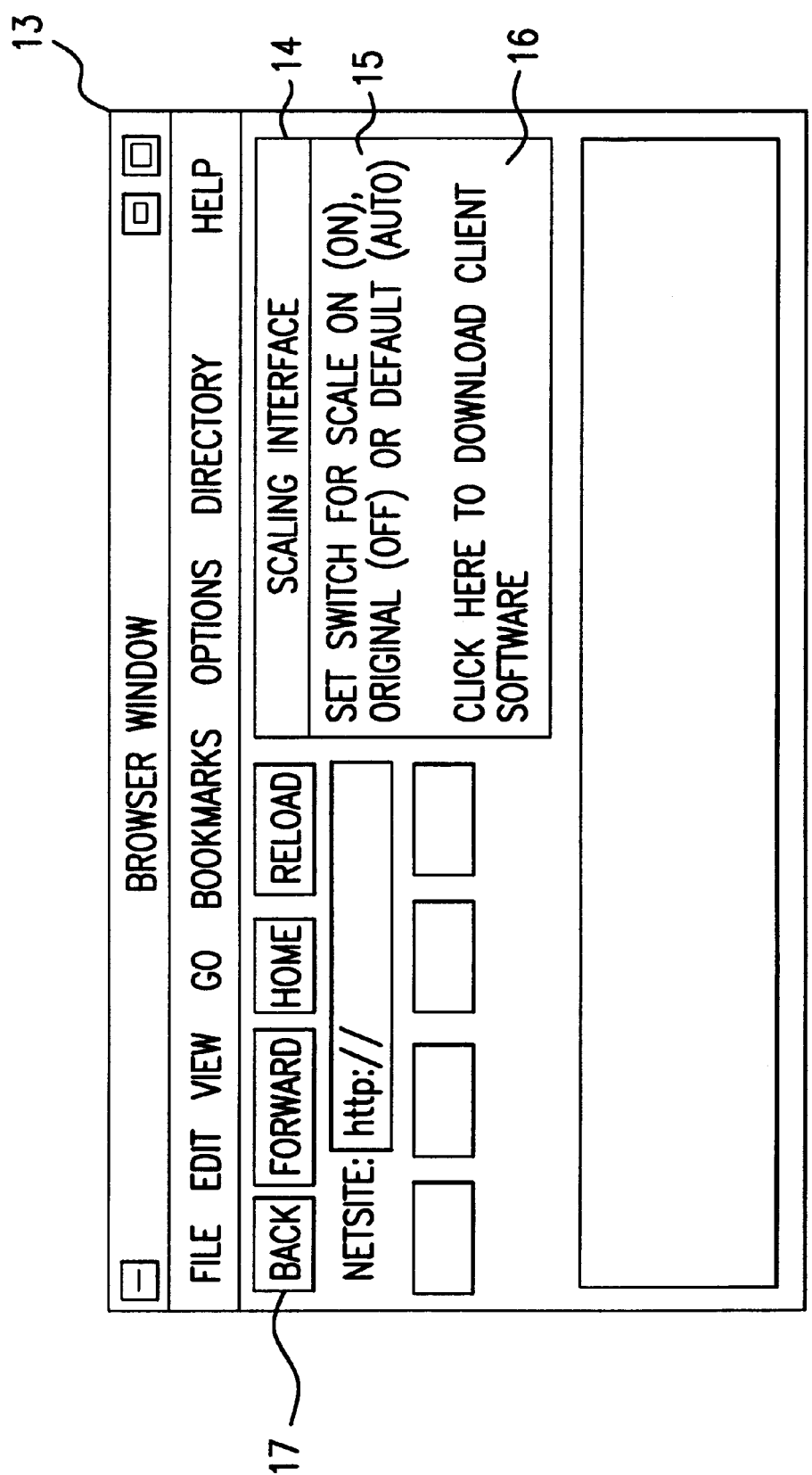
FIG. 3 is a schematic diagram illustrating an example of a user interface providing a non-enabled network client with scaling and refinement functionality.

The embedded instructions transmitted to network client 3 enable the user to benefit from some of the scaling capabilities of remote scaling server 1. In this embodiment, as illustrated in FIG. 3, the embedded instructions drive a user interface in the form of a pop-up window 14 that is displayed at the top of a browser window 13. Pop-up window 14 includes a three-state switch 15 having "ON," "OFF" and "AUTO" settings, and may also include a hypertext link 16 which the user may follow to download specialized decoding client software supporting more sophisticated scaling functionality (become "enabled"). The initial setting of three-state switch 15 may be based upon the prior determination by HTTP remote proxy 6 as to network client 3's reception of scaled content. If so, the three-state switch 15 is set to "ON;" if not, three-state switch 15 is set to "OFF." The goal of this feature is to provide the user with some means for communicating a preference to HTTP remote proxy 6 with regard to the content quality/latency tradeoff. Persons skilled in the art will recognize that many other means for providing this capability are possible, and such other means could enable the user to communicate preferences beyond simply the scaling of content.

In this embodiment, pop-up window 14 enables the user to change his or her preference as to whether scaled or original content is desired, and communicates such changes to HTTP remote proxy 6. Pop-up window 14 may or may not interact with browser 12, meaning the user's preference will only take effect after setting three-state switch 15 and clicking on the browser's 12 "RELOAD" button 17 to cause browser 12 to request the (scaled or unscaled) content for presentation to the user. Subsequent pages in the current session may then be rendered in accordance with the new setting of three-state switch 15 without further user intervention. Upon receipt, HTTP remote proxy 6 updates user preference table 11 accordingly. As an alternative, pop-up window 14 may be configured to automatically invoke the "RELOAD" operation when the user indicates a change (such as by flipping three-state switch 15). Where browser 12 is a JavaScript-enable browser, JavaScript instructions inserted by HTTP remote proxy 6 in the HTML document may "POST" the state of three-state switch 15 to HTTP remote proxy 6 and also cause browser 12 to "RELOAD" the current URL.

Once encode manager 7 determines that network client 3 is to receive scaled content (either by default or by the user flipping three-state switch 15 to "ON"), any request currently being processed, as well as future requests, will return scaled versions of the requested content, thereby providing the user with improved download performance. Conversely, in the event the user desires a more refined (higher quality) version of the object currently being viewed, the user may simply set three-state switch 15 to "OFF" and again click on "RELOAD" button 17 of browser 12. HTTP remote proxy 6 will then transmit the original version of the hypertext object being currently viewed, and future requests for the same or other hypertext objects will also return original (unscaled) versions.

In view of limitations inherent in today's popular Web browsers, another consequence of network client 3 being non-enabled is that encode manager 7 may in some embodiments be limited to scaling/encoding content to a format that browser 12 is capable of rendering. Even in such embodiments, however, significant performance gains are nevertheless possible. For example, GIF files containing many colors may be changed to compressed JPEG files that require substantially fewer bytes (and therefore download faster). These compressed JPEG files may be natively decoded by nearly all of today's popular Web browsers. Such limitations may not exist in all known Web browsers and/or may be eliminated in future versions of Web browsers.

It is possible to allow a non-enabled network client 3 to save the state of three-state switch 15 on network client 3 across multiple sessions of browser 12 using what is known in the art as "cookies." In other words, a cookie may be used to store the state of three-state switch 15 persistently. When a new session of browser 12 is initiated by a user, this state information may be read from network client 3 and "POSTed" by the JavaScript code (inserted at the beginning of the HTML document) to HTTP remote proxy 6 before any content for the requested hypertext object is actually sent to network client 3. This will allow HTTP remote proxy 6 to update user preference table 11 with the correct state of three-state switch 15, and hence send correctly-scaled content to network client 3. In this embodiment of network client 3, the state information may be "POSTed" to HTTP remote proxy 6 each time a given URL is requested by browser 12. This will allow network client 3 to receive the correctly-scaled content even if the HTTP remote proxy 6 to which it is coupled changes due to, for example, a change in geographical location of network client 3 or network load-balancing procedures.

The embodiment shown in FIG. 2 may also be used for network clients 3 that already access Internet 2 through a standard proxy. JavaScript-enabled browsers 12 may query the local IP address of network client 3 and "POST" this information to HTTP remote proxy 6. The HTTP header of this "POST" message will contain the IP address of the standard proxy, which will now be different from the IP address of network client 3 (which is included in the contents of the message). A comparison of the two IP addresses will ensure that network client 3 resides behind a standard proxy. HTTP remote proxy may then use this information to update scaling information about network client 3 in user preference table 11.

Figure 4:
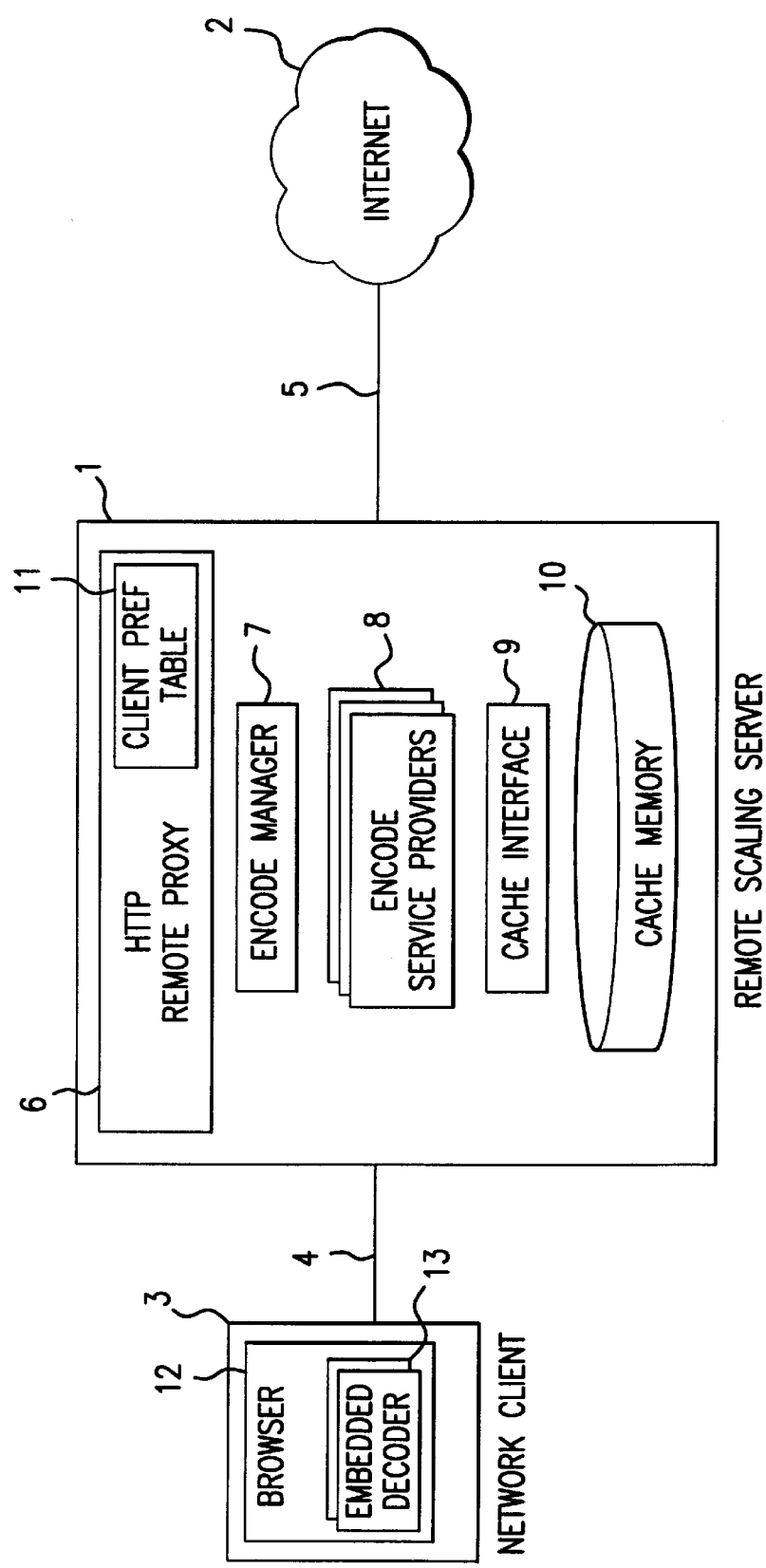
FIG. 4 is a schematic diagram illustrating an embodiment of the present invention directed to a non-enabled network client including embedded decoders.

In order to provide users with additional benefits arising from more sophisticated scaling while still limiting the need for preloaded client software, the embodiment of FIG. 2 may be modified by enhancing the capability of browser 12 to render additional MIME types. In this alternate embodiment, browser 12 may include one or more embedded decoders 13, as illustrated in FIG. 4. Embedded decoders 13 are integrated viewers that enable browser 12 to render data streams having non-standard MIME types as they are received by network client 3. A number of utilities for implementing suitable embedded decoders 13 are commercially available, including Netscape plug-ins, ActiveX™ controls and Java applets. These utilities typically also support built-in user interaction features to communicate with remote scaling server 1, such as refinement requests to obtain higher quality representations of said images.

Figure 5:
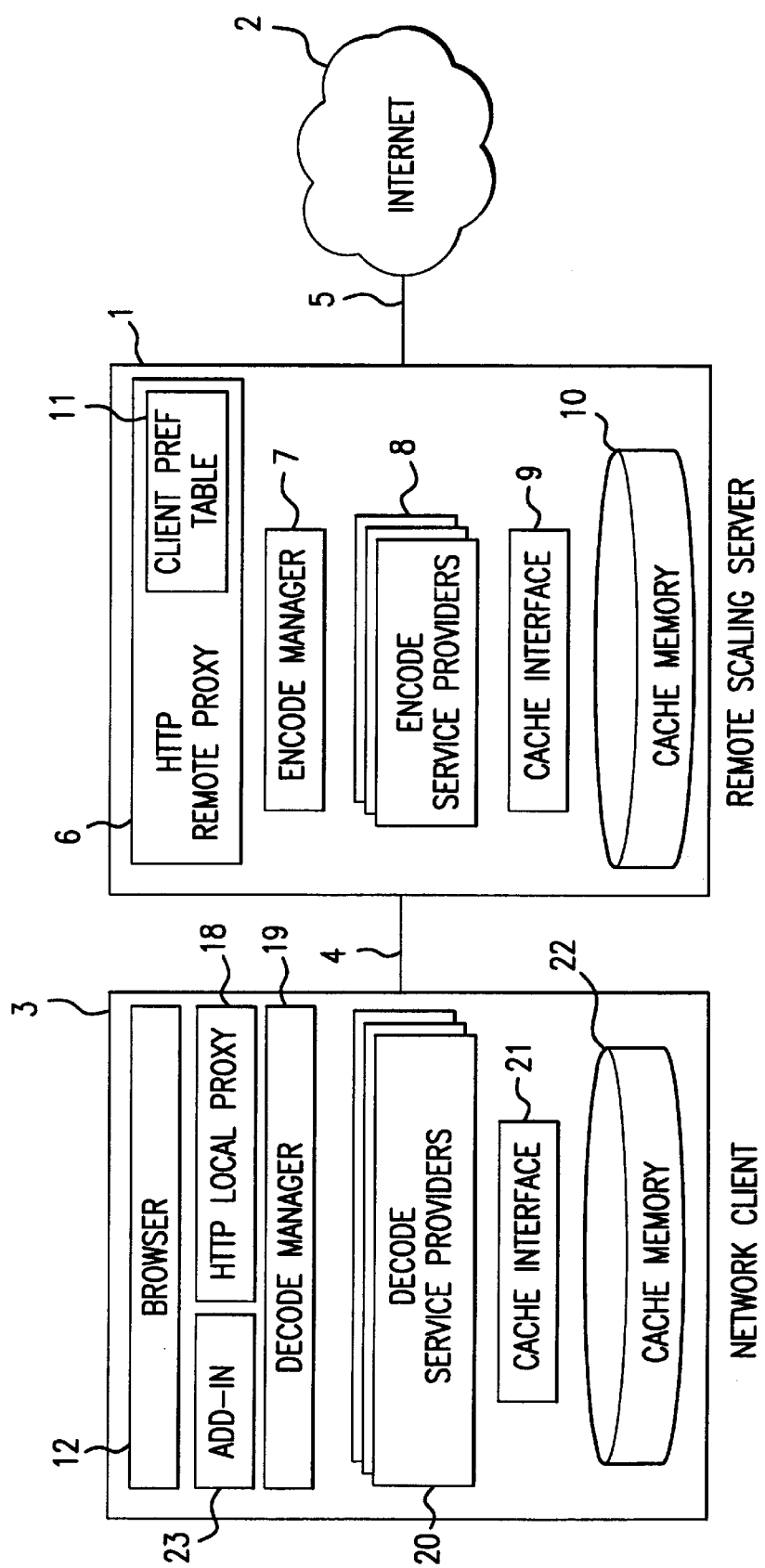
FIG. 5 is a schematic diagram illustrating an embodiment of the present invention directed to an enabled network client.

In another embodiment of the present invention, illustrated in FIG. 5, network client 3 may be "enabled," containing specialized decoding software to support more sophisticated scaling features than are provided by the above-described embodiments. Network client 3 includes an HTTP local proxy 18 coupled to a decode manager 19 which, similar to encode manager 7 of remote scaling server 1, controls one or more decode service providers 20. Each decode service provider 20 is responsible for decompression and/or translation of one or more different types of data content, and serves as a counterpart to an encode service provider 8. As in remote scaling server 1, network client 3 may include a client-side cache memory 22 managed by a client-side cache interface 21. Here, however, client-side cache interface 21 may be an already-existing facility supported by the operating system, such as WININET. Using an existing caching facility reduces the amount of software that is to be downloaded to network client 3 to implement this embodiment, and also allows other applications, such as disconnected browsers, to share client-side cache memory 22.

Figure 6:
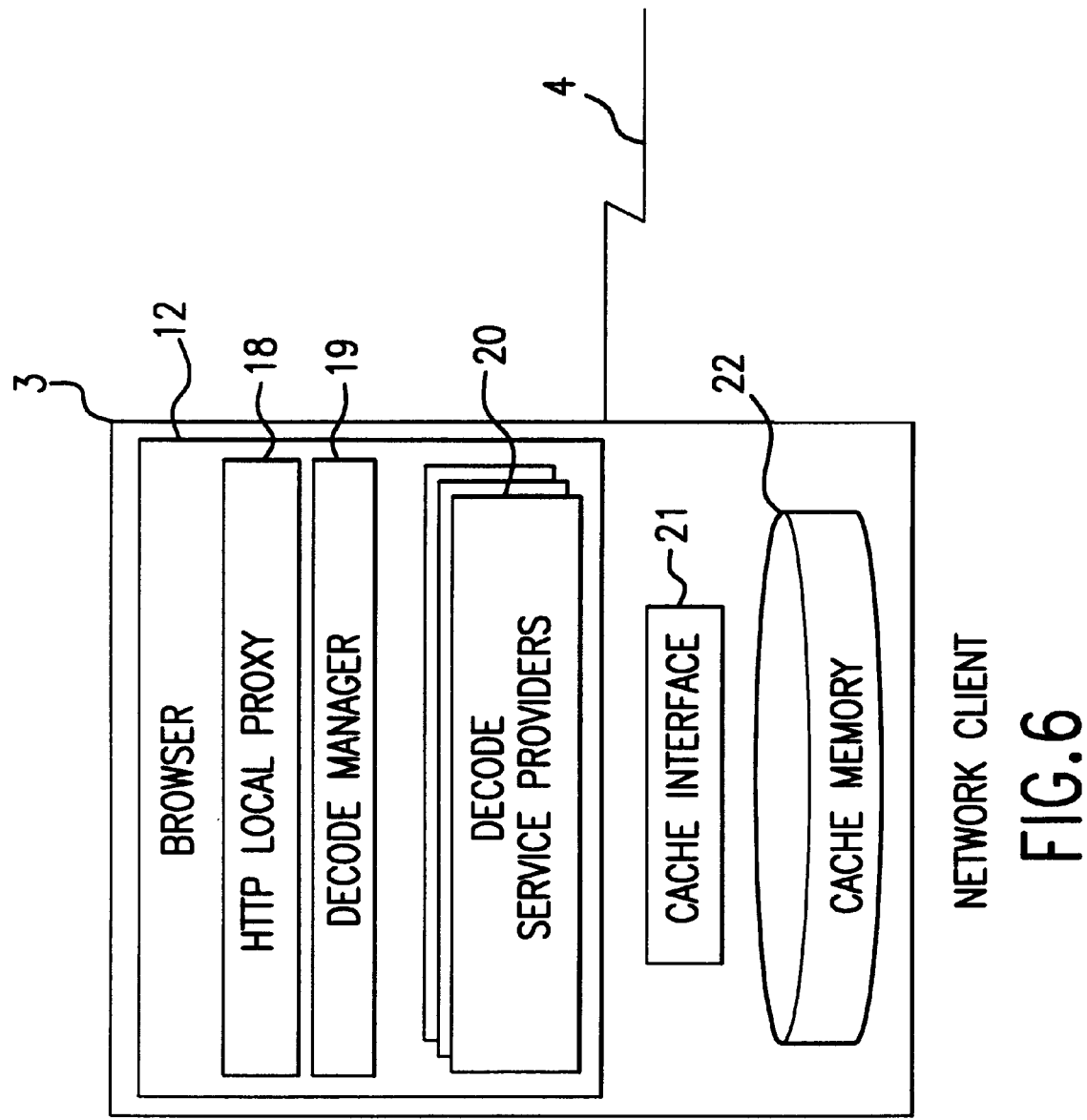
FIG. 6 is a schematic diagram illustrating an embodiment of the present invention directed to an enabled network client with client software integrated in the browser.

HTTP local proxy 18, decode manager 19 and decode service providers 20 (collectively, the client software) may be downloaded to network client 3 on demand, such as by clicking on hypertext link 16 presented by pop-up window 14 illustrated in FIG. 3. Alternatively, the client software could be distributed to users on a portable storage medium, such as a diskette or CD-ROM, or it may be preloaded on an off-the-shelf personal computer. In the embodiment of FIG. 5, the client software is separate from browser 12; however, in yet another embodiment of the present invention, the client software may be integrated in browser 12 (see FIG. 6).

The enabled client embodiments provide network client 3 with expanded flexibility for rendering hypertext objects. As in the non-enabled client embodiments described above, enabled network client 3 may receive a scaled data stream from HTTP remote proxy 6 in a format that is already supported by the standard internal rendering software of browser 12 (e.g., JPG, GIF). In addition, HTTP remote proxy 6 may scale a hypertext object to a data stream having a new MIME type capable of being translated by decode service provider 20 to a MIME type supported by browser 12. For example, HTTP remote proxy 6 could transmit a file compressed using a non-standard, not well-supported or leading edge compression algorithm to network client 3, and decode service provider 20 could uncompress the file back to its original format. This approach has the benefit of relieving HTTP local proxy 18 from having to provide a user interface, and eliminates restrictions imposed by limitations as to the data types supported by browser 12. For example, an encode service provider 8 of HTTP remote proxy 6 may use a fractal compression algorithm to scale data for transmission to network client 3, and a corresponding decode service provider 20 may decompress that data to a "standard" format, such as JPEG, before giving it to browser 12 for rendering. In this way, the compression/decompression process can remain transparent to users, browsers and Web servers.

Yet another possibility is that enabled network client 3 includes one or more add-ins 23 specifically configured to render or playback particular new MIME types generated by remote scaling server 1. Add-ins 23 may be implemented, for example, using Netscape plug-ins or ActiveX controls. Moreover, add-ins 23 may be installed as part of the client software, as illustrated in FIG. 5, or integrated with browser 12. Such add-ins 23 are beneficial in that they generally may be configured to permit a user to click on a specific object to obtain a different quality representation. Add-ins 23 are also beneficial in that they appear to a user to be well-integrated with browser 12, and are easily upgradeable. Combinations of the above-described presentation facilities are also possible.

In an advantageous optional application of add-ins 23, network client 3 may be configured to request that an appropriate add-in 23 be downloaded from HTTP remote proxy 6 in the event that network client 3 determines it is unable to decode a particular received data type. HTTP remote proxy 6 could then download the necessary decoder or, alternatively, resend the data in a different format. This facility provides for automatic extension of the system, ensuring that client software is as current as possible.

In the embodiment of FIG. 5, browser 12 is configured to send all HTTP requests through HTTP local proxy 18, thus allowing HTTP local proxy 18 to improve retrieval and rendering of requested hypertext objects. For example, when HTTP local proxy 18 receives an HTTP request from browser 12 for a hypertext object associated with a Web page, it passes the URL to client-side cache interface 21 to check whether a copy of the hypertext object already exists in client-side cache memory 22. If the hypertext object is cached, HTTP local proxy 18 passes the cached object to browser 12 for rendering. If the requested hypertext object is not cached, HTTP local proxy 18 transmits an HTTP request to remote scaling server 1 for processing. HTTP local proxy 18 may use a custom Get( ) request for this purpose to enable remote scaling server 1 to identify whether network client 3 is enabled or not. Performing the processing described above with reference to other embodiments, remote scaling server 1 will return a data stream for the hypertext object to HTTP local proxy 18.

Upon receipt of the requested hypertext object, HTTP local proxy 18 examines the file to identify any included hypertext objects, such as pictures. These hypertext objects are represented as hypertext links in the hypertext object. Where browser 12 is a Netscape Navigator v.3.0 browser, for example, HTTP local proxy 18 may issue GetDim( ) calls to HTTP remote proxy 6 to return the dimensions of such hypertext objects. The hypertext object may already include information relating to the dimensions of the object, in which case the GetDim call is unnecessary. Other browsers 12, such as the Internet Explorer browser, support different facilities for determining the dimensions of an object to be rendered, all of which are contemplated within the teachings of the present embodiment. Alternatively, this determination may be done entirely in the remote scaling server 1.

Once the dimensions are known, decode manager 19 checks the MIME type of the hypertext object against a table of supported MIME types. If the MIME type is matched (indicating HTTP remote proxy 6 is capable of scaling the hypertext object) and the dimensions of the object are sufficiently large to justify the expense of scaling, HTTP local proxy 18 modifies the HTML for the object to ensure that browser 12 invokes an appropriate add-in 23 to render the object. For example, HTTP local proxy 18 might replace the line:
<IMG SRC=/img/my_image.gif WIDTH=20 HEIGHT= 20> with the line:
<EMBED SRC=/img/my_image.gif WIDTH=20 HEIGHT=20 TYPE=image/x-compressed-gif>.

HTTP local proxy 18 then passes the hypertext object to browser 12. In order to render the hypertext object to the user, it is desirable for browser 12 to reconcile the links for all of the hypertext objects. When browser 12 detects an EMBED statement in the HTML such as that above, it attempts to invoke an add-in 23 indicated by the MIME type (in this particular embodiment, image/x-compress-gif). Assuming the new MIME type is supported, browser 12 invokes the appropriate add-in 23 to render the hypertext object, which in turn makes an HTTP request to remote scaling server 1 to return a version of the hypertext object. The particular version returned (original, scaled, specific scale refinement) is determined by HTTP remote proxy 6 as described above, or it may be provided by HTTP local proxy 18 based on user input. As a data stream for the hypertext object is returned by remote scaling server 1, HTTP local proxy 18 passes the handle for the data stream to the appropriate decode service provider 20 for decompression/translation. The decompressed/translated data stream may then be simultaneously stored in client-side cache memory 22 and displayed to the user by add-in 23.

Where browser 12 encounters HTML for hypertext objects having "standard" MIME types, browser 12 itself makes an HTTP request to remote scaling server 1. As described above, HTTP remote proxy 6 may choose to scale the data stream for the hypertext object prior to returning it to network client 3. The returned data stream may be directly displayable by the internal rendering software of browser 12, or may be processed by an embedded decoder.

Figure 7:
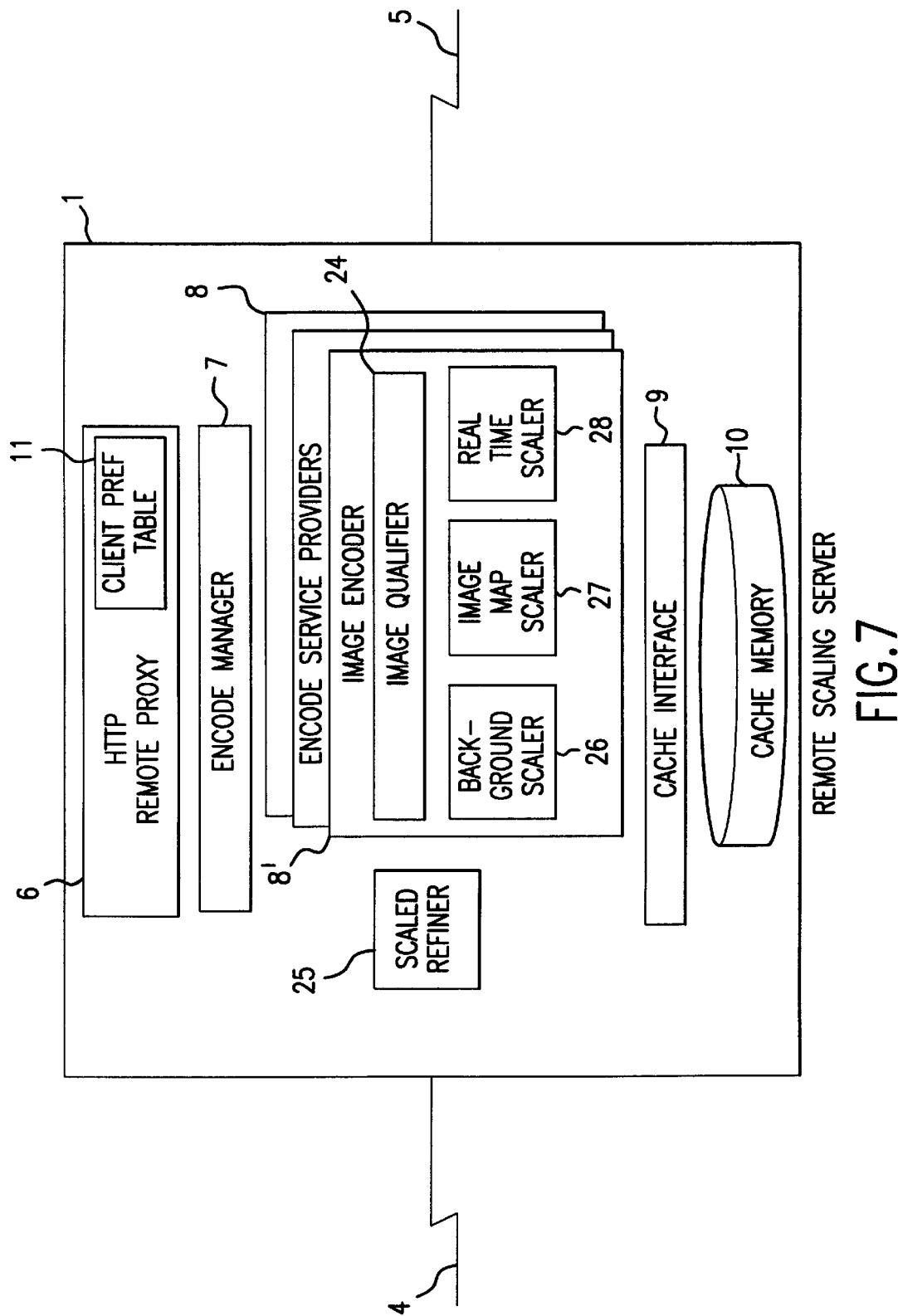
FIG. 7 is a schematic diagram illustrating an embodiment of an encode service provider configured to scale image data.

Embodiments of the present invention may be advantageously applied to improve data access performance for virtually any content requiring a significant amount of time to download or that is difficult for network client 3 to render/playback. To further illustrate some of the features and advantages of such embodiments, FIG. 7 shows in more detail an embodiment of remote scaling server 1 wherein one of the encode service providers 8 is an image encoder 8' for compressing image data. While some of the features of the image encoder 8' are useful when remote scaling server 1 interacts with a non-enabled network client, image encoder 8' is most beneficial when used with an enabled network client.

When HTTP remote proxy 6 receives a data stream from the Internet having an image MIME type, encode manager 7 passes the handle for the data stream to image encoder 8'. Image encoder 8' first invokes an image qualifier 24 to determine whether to scale the particular received data stream. This filtering process is desirable for performance and scaleability reasons, such as the number of simultaneous users which may be supported, since many data streams will contain images that may be inefficient to compress (such as bullet icons, line separators and buttons). If the input data stream does not pass this filtering process, the non-scaled data stream is stored in server-side cache memory 10 as an original version and is returned to the requesting network client 3. If the data stream passes the filter, image encoder 8' invokes an appropriate sub-routine for scaling. Both the original and newly-scaled versions of the data stream are stored in server-side cache memory 10, with the scaled version being assigned a new MIME type indicating the scaled format. Such formats might include, for example, a format for scaling image data into a JPEG format with refinements, a format for scaling image data using fractal compression with refinements, and a format for scaling video data using fractal compression with refinements. Since such new scaled formats are not standard, when the reformatted data stream ultimately arrives at network client 3, the new MIME type is used to determine how to render the data stream.

In the embodiment shown in FIG. 7, image encoder 8' also includes a background scaler 26, an image map scaler 27, and a real-time scaler 28. Real-time scaler 28 performs scaling that it is desirable to complete before the requested image is returned to the user (as opposed to being scaled and cached for later retrieval). Once scaling is started, real-time scaler 28 passes the handle for the scaled data stream to HTTP remote proxy 6 for transmission to network client 3 as soon as any part of the data is available. Both the original and scaled data streams are stored in server-side cache memory 10.

Background scaler 26 scales objects that already reside in server-side cache memory 10. Since this scaling is performed in the background (not visible to the user), advanced compression techniques that require extensive processing may be used. For example, fractal compression offers up to a 10× to 100× decrease in download time while maintaining quality similar to gif-compressed images, but its processing requirements are so extensive that it would result in an unacceptably long latency if done in real-time. By doing such advanced compression in the background, future requests for the scaled object will require significantly shorter download times.

To facilitate background scaler 26, server-side cache interface 9 may maintain a table (not shown) of cache entries that are most likely to benefit from background compression. This table might contain, for example, the addresses of entities in server-side cache memory 10 that exceed a predetermined minimum size and access frequency, permitting background scaler 26 to scale on a priority basis the largest, most frequently accessed cached objects. Background scaler 26 may sequentially process this list during idle times, using the addresses from the table to retrieve cached entities, scale them, and store them back to server-side cache memory 10. Subsequent image refinement requests and cache hits for these entities will then result in much smaller download latencies. Background scaler 26 may also store the original entity back to server-side cache memory 10 uncompressed, allowing network client 3 users to selectively browse images of increasing quality (with a concomitant increase in download time).

Content providers on the Internet frequently use pages with image maps, characterized by "clickable" images. One approach to reducing latency during transmission of such objects is to use lossy compression techniques to compress the object to a new format. Another approach is to reduce the dimensions of the image; however, this may cause the corresponding image map to become misaligned, and therefore inoperable. On the other hand, reducing the dimensions of an image may be desirable where network client 3 comprises a device with a small visual display. In the present embodiment, an image map scaler 28 addresses this problem, permitting data streams containing image maps to be effectively scaled.

Image maps may be one of at least two types—client-side image maps or server-side image maps—depending upon where the mapping from coordinate to hyperlink takes place. For client-side image maps, the HTML markup included in the data stream contains the coordinates used by the image map. Image map scaler 28 may then scale these coordinates by the same amount as it scales the image, thereby ensuring the integrity of the mapping is maintained. In other words, the goal is to maintain the aspect ratio while scaling the coordinates of the so-called "hot regions" accordingly.

For server-side image maps, mapping is typically done by a CGI (Common Gateway Interface) program that runs on a network server. In an alternate embodiment, click coordinates are scaled on the client using the same ratios as the image scaling. For instance, if a 40×40 pixel image is scaled to 10×10 and contains a server side image map, then a click point of 5×7 on the scaled image would be translated to 20×28 and sent to the CGI program. Scaling of image maps may be performed, for example, by an add-in 23 in network client 3, by HTTP local proxy 18, by HTTP remote proxy 6, or by any combination of these.

In the embodiment illustrated in FIG. 7, remote scaling server 1 also includes a scaled refiner 25 which enables network client 3 to receive varying quality images upon request. Such functionality is generally known in the art, and typically is accomplished by transmitting a new higher-quality image to replace a previously-transmitted low-quality image. The present embodiment provides an improved approach in which a number of progressively higher-quality versions of an image are stored in server-side cache memory 10, for example, as a progressive JPEG or fractal image. When a page is initially sent to network client 3, only the first progressive stage or rendition (the lowest quality version) of each image on the page is transmitted. If the user subsequently requests an improved image, such as by clicking on the image, the next progressive stage of the image is retrieved from server-side cache memory 10 and sent to network client 3, where it is combined with the first image to generate a higher-quality image. The next progressive stage image may be stored as a differential from the previous progressive stage. This unique approach offers the dual advantage of a fast initial download and an efficient way to send gradual refinements. Gradual refinements may be sent automatically or at the request of an add-in 23 or HTTP local proxy 18, and may be used to improve the quality of a displayed object while a user is viewing it. Scaled refiner 25 thus provides performance that is superior to the HTML "lowsrc" markup feature, which sends a low-quality image and then upgrades that image by sending a completely new higher-quality image, thus completely wasting the time spent in sending the lower-resolution image. By contrast, assuming an enabled network client 3, scaled refiner 25 may send only enough data to "upgrade" a previously-transmitted image, for example, from low to medium, or from medium to high quality.

Figure 8:
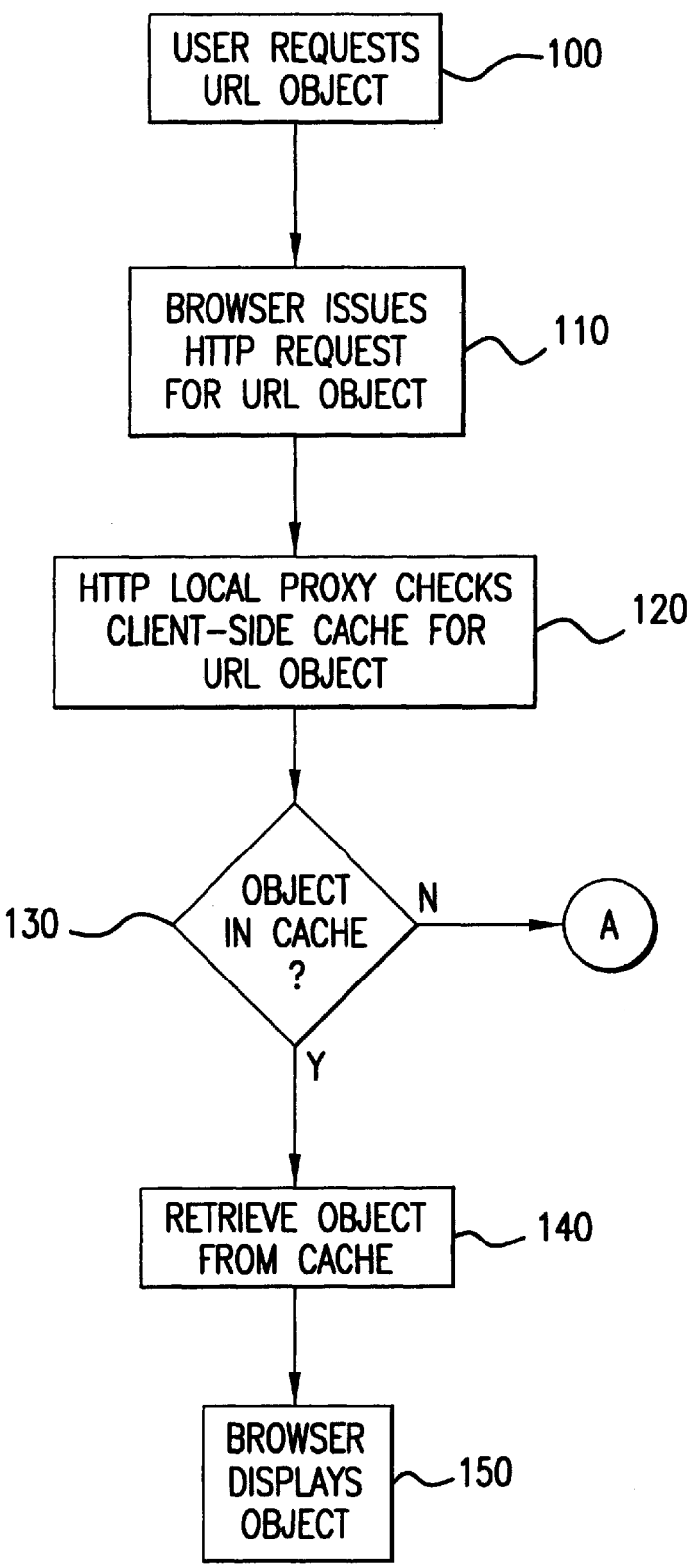
FIGS. 8–10 are flow charts illustrating the logic performed by an embodiment of the present invention to present a requested URL object to a network client user.
Figure 9:
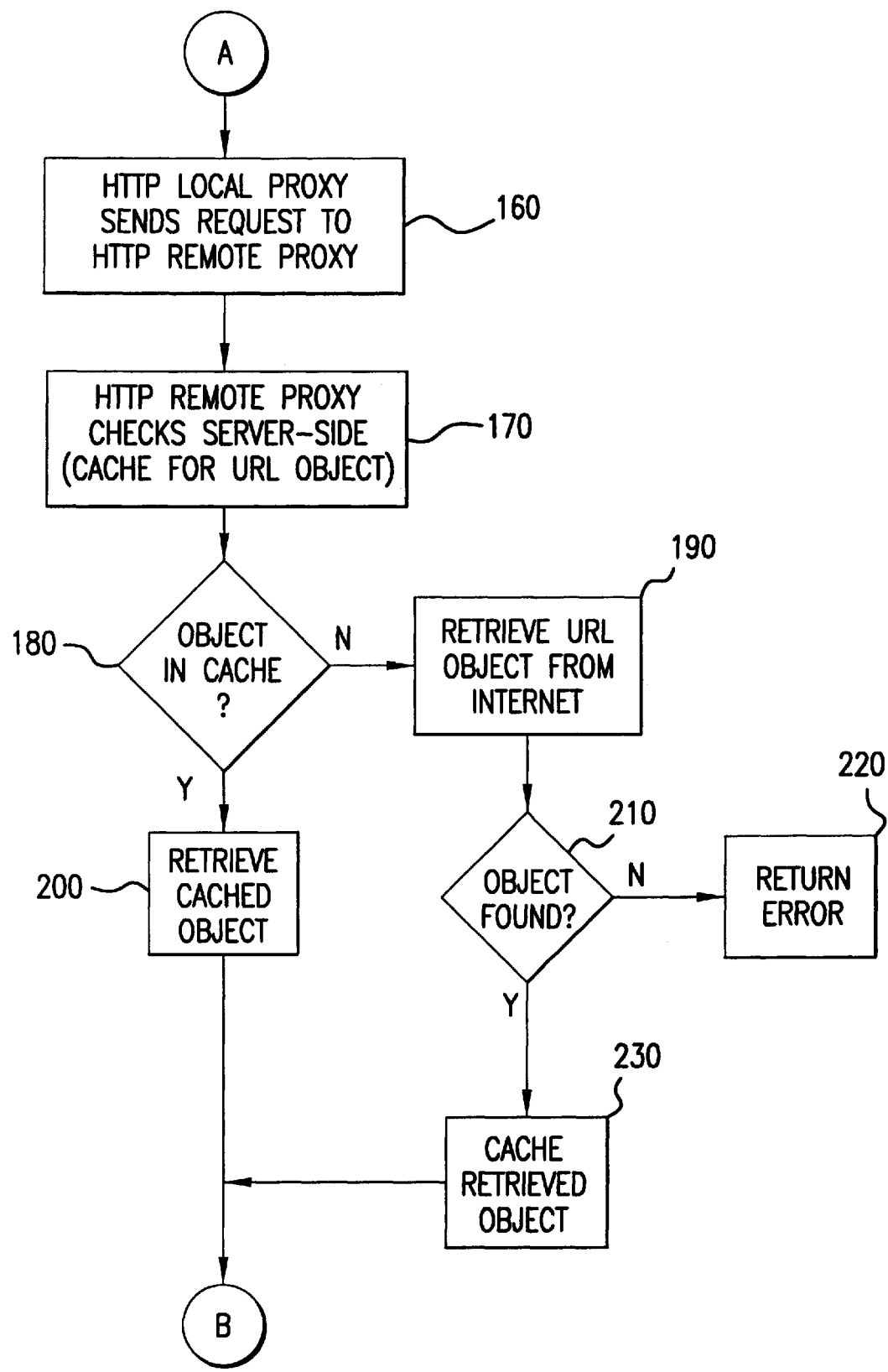
Figure 10:
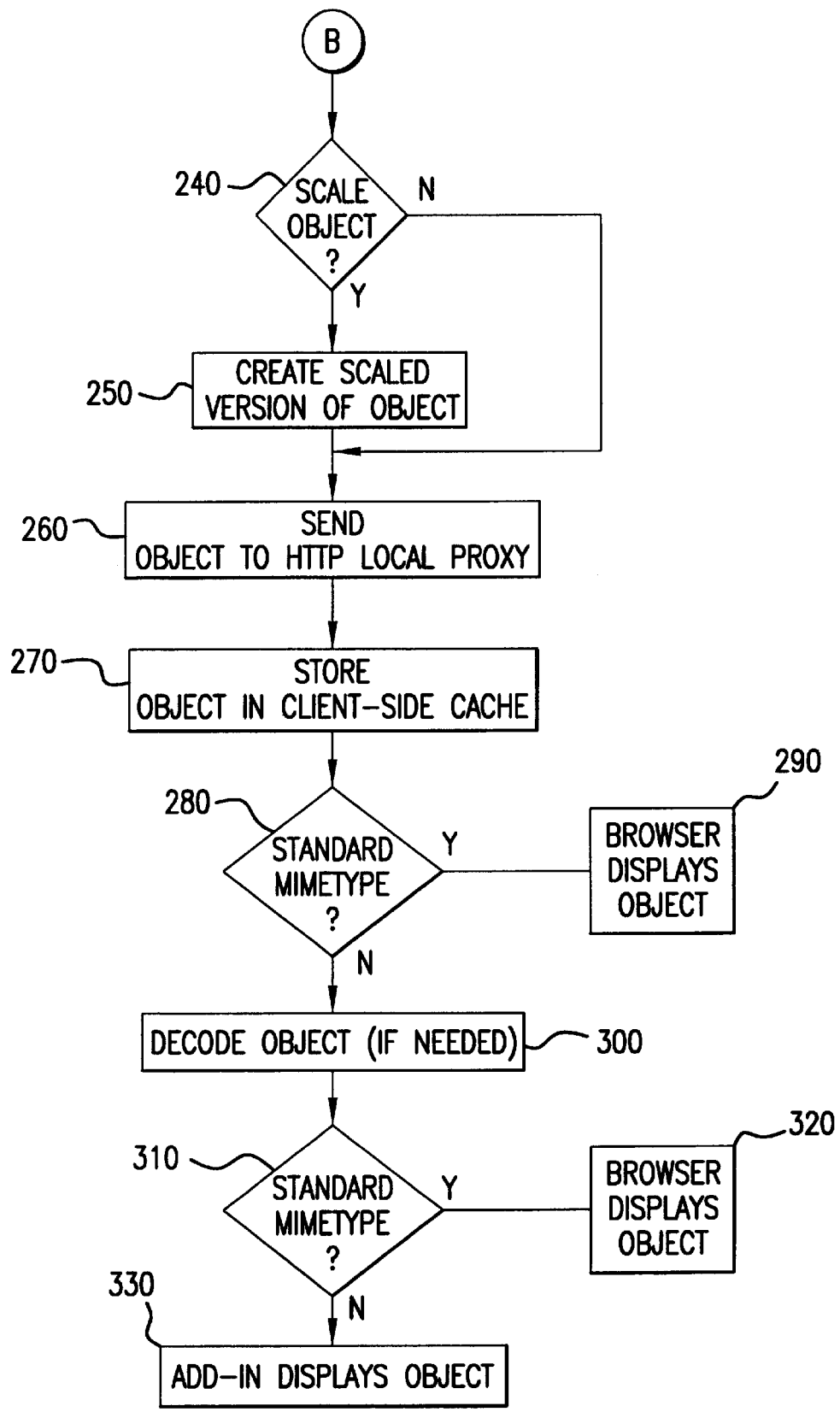

To further illustrate the features and benefits of embodiments of the present invention, the flow charts provided in FIGS. 8–10 illustrate the logic for an embodiment of a method by which an enabled network client may render a hypertext object resident on the Internet. The flow charts are not intended to be comprehensive of all processing that is performed, but rather are intended to describe the overall flow of the method. Detailed descriptions of the various processes have been provided above with reference to various disclosed embodiments. Where practical, the following description includes reference numbers for previously-described structural elements.

Referring now to FIG. 8, processing begins when a user on network client 3 requests a hypertext object from browser 12 (Step 100). This could be in the form of a request for a specific Web page, in which case a plurality of hypertext objects will likely be displayed to the user, or in the form of a click on an image already being displayed to the user. Browser 12 may be configured to pass all HTTP requests through HTTP local proxy 18, so HTTP local proxy 18 may intercept the HTTP(URL) call from browser 12 (Step 110).

In this particular embodiment, HTTP local proxy 18 first checks whether the requested hypertext object exists in client-side cache memory 22 (Step 120). To do this, HTTP local proxy 18 may invoke decode manager 19 using a GetScaledObject(URL) call, which in turn issues a GetEntry call to client-side cache interface 21 to open a stream for the cached object. This effectively "retrieves" the cached object from client-side cache memory 22 if it exists (Step 140). HTTP local proxy 18 then passes the stream to browser 12, which displays the cached object to the user (Step 150).

Referring now to FIG. 9, if the requested URL object is not found in client-side cache memory 22, HTTP local proxy 18 transmits a request for the object to remote scaling server 1 using, for example, a Post of a GetStage(URL, Stage=0) call (Step 160). Upon receipt of this call, HTTP remote proxy 6 invokes encode manager 7, which in turn issues a GetScaledObject( ) call to server-side cache interface 9 to determine whether a non-scaled version of the requested hypertext object already exists in the server-side cache memory 10 (Step 170). If the hypertext object is cached, server-side cache interface 9 issues a GetEntry call to open a stream for the cached object (Step 200). In addition, encode manager 7 may issue a GetProperties(URL, . . . ) call to server-side cache interface 9 to retrieve information about the scaling properties and scaled status (such as the refinement level) of the cached object.

If encode manager 7 determines that the requested hypertext object does not exist in the server-side cache memory 10, HTTP remote proxy 18 issues an HTTP request to retrieve the hypertext object from Internet 2 (Step 190). If the object is not found, HTTP remote proxy 18 returns an error to network client 3 which browser 12 will communicate to the user (Step 220); if the object is found, HTTP remote proxy 18 passes the handle for the incoming data stream to encode manager 7, which in turn initiates caching of an original version of the retrieved hypertext object (Step 230).

Referring now to FIG. 10, once the requested hypertext object has started to be obtained, encode manager 7 determines whether to scale the object before transmitting it to network client 3 (Step 240). Both this decision-making process and exemplary scaling processes are described in detail above. For purposes of the present illustration, assume encode manager 7 determined that scaling was appropriate and therefore generated a scaled version of the requested hypertext object (Step 250). HTTP remote proxy 6 transmits a data stream for the scaled hypertext object to network client 3 (Step 260). Upon receipt, HTTP local proxy 18 initiates caching of the scaled hypertext object (Step 270). In addition, decode manager 19 interrogates the MIME type of the received hypertext object to determine whether a new MIME type has been established by remote scaling server 1 (Step 280).

If the hypertext object is of a standard MIME type, HTTP local proxy 18 passes the handle for the received data stream to browser 12 for display to the user (Step 290). If the hypertext object is of a non-standard MIME type, decode manager 19 passes the handle to an appropriate decode service provider 20 for decoding/translation (Step 300). The result of the decoding/translation process may be a hypertext object having a standard MIME type, in which case browser 12 can readily display the object to the user (Step 320), or the result may be a hypertext object having a non-standard MIME type, in which case browser 12 invokes add-in 23 to display the object (Step 330).

As the foregoing description demonstrates, embodiments of the present invention provide a system for improving the communications capabilities of computers accessing networks such as the Internet. Embodiments of the invention may be advantageously applied to computers having limited communications bandwidth available, such as mobile computers or personal computers accessing a network over a modem connection. The unique features of such embodiments enhance the ability of these computers to access data on the network in a timely fashion with reduced user-visible latencies, thereby enabling content authors to produce rich content without fear that only users with highly-sophisticated data communications and display capabilities may enjoy it. Embodiments of the present invention may also be advantageously used for purposes other than, or in addition to, reducing latency. Such purposes include, for example, converting color images to greyscale images for users lacking a color display; filtering and/or deleting undesired content, such as pornography; adding content, such as advertising; and language translation.

Although the present invention has been described with reference to embodiments for accessing data from the Internet, persons skilled in the art will recognize that it is equally applicable to other networking environments. For example, embodiments of the present invention may be used to enhance data communications between a network client computer and an "intranet." An intranet typically is a secure corporate network modeled after the Internet architecture, and generally includes mechanisms for communicating with external networks such as the Internet. In addition, persons skilled in the art will recognize that embodiments of the present invention may also be used for scaling objects other than hypertext objects. For example, embodiments may provide facilities for implementing sophisticated compression algorithms for standard text files.

The foregoing is a detailed description of particular embodiments of the present invention. The invention embraces all alternatives, modifications and variations that fall within the letter and spirit of the claims, as well as all equivalents of the claimed subject matter. For example, some or all of the features described above as being provided by an HTTP remote proxy may be implemented in a content server. Likewise, some or all of the features described above as being provided by an HTTP local proxy may be implemented in a browser application. Persons skilled in the art will recognize from the foregoing detailed description that many other alternatives, modifications and variations are possible.

What is claimed is:

1. A system for retrieving an object over a computer network, said system comprising a network client and a remote scaling server coupled between the network client and the computer network, wherein:

the network client includes a browser for rendering an object and a graphical user interface enabling a user to selectively establish an encoding preference for the object to be rendered, the graphical user interface being automatically provided to the network client in response to a request for the object to be rendered and comprising a set of automatically executing instructions for requesting an encoding preference from a user, receiving a response from the user, and transmitting the user response to the remote scaling server; and the remote scaling server includes a remote proxy and an encode service provider, wherein said remote scaling server is configured to retrieve an object from the computer network using said remote proxy, obtain a user-established encoding preference from the network client through the graphical user interface, encode the object using said encode service provider in accordance with the received user-established encoding preference, and transmit the encoded object to said network client using said remote proxy.

2. The system of claim 1, wherein said encode service provider is configured to selectively encode an object having a predetermined characteristic.

3. The system of claim 2, wherein said remote scaling server includes a plurality of encode service providers, said remote scaling server being configured to invoke one of said plurality of encode service providers based at least in part on the predetermined characteristic of the object retrieved from the computer network.

4. The system of claim 2, wherein said network client further includes an embedded decoder configured to selectively decode an object having a predetermined characteristic.

5. The system of claim 2, wherein said network client further includes a local proxy in communication with said browser, said local proxy being configured to request an object from the computer network through said remote proxy and to receive an encoded object from said remote proxy.

6. The system of claim 5, wherein said network client further includes a decode service provider coupled to said local proxy, said decode service provider being configured to selectively decode an object having a predetermined characteristic.

7. The system of claim 6, wherein said decode service provider comprises a component of said browser.

8. The system of claim 6, wherein said network client further includes a plurality of decode service providers, said network client being configured to invoke one of said plurality of decode service providers based on a predetermined characteristic of the object received from said remote proxy.

9. The system of claim 1, wherein said graphical user interface is activated by instructions embedded in a data stream transmitted to said network client by said remote scaling server.

10. The system of claim 9, wherein said embedded instructions execute automatically upon receipt by said network client.

11. The system of claim 1, wherein said user preference corresponds to a desired content quality for the object to be transmitted to said network client.

12. The system of claim 1, wherein said network client further includes a decode service provider configured to determine whether said browser is capable of rendering an object received by said network client and to selectively translate the object to a format supported by said browser.

13. An apparatus for transferring an object to a client over a communications link, said apparatus comprising a server configured to receive an object request from the client, download a graphical user interface to the client in response to receiving the object request, retrieve an object from a data store coupled to the server, obtain a user-entered encoding preference from the client through the downloaded graphical user interface, selectively encode the object based on one or more predetermined selection criteria in accordance with the received user-entered encoding preference, and transmit the encoded object to the client, wherein the graphical user interface comprises a set of automatically executing instructions for requesting an encoding preference from a user of the client, receiving a response from the user, and transmitting the response back to the server.

14. The apparatus of claim 13, wherein said predetermined selection criteria comprise a characteristic of the object.

15. The apparatus of claim 13, wherein said predetermined selection criteria comprise a characteristic of the client.

16. The apparatus of claim 13, wherein said predetermined selection criteria comprise a characteristic of the communications link.

17. The apparatus of claim 13, wherein said data store resides on an external network, said server being coupled to said external network over a second communications link.

18. The apparatus of claim 17, wherein the external network comprises the Internet.

19. The apparatus of claim 17, further comprising a memory coupled to said server, said server being further configured to store one or more representations of an object in said memory.

20. The apparatus of claim 17, wherein said server includes a plurality of encode service providers, each of said encode service providers being configured to scale an object according to at least one of said predetermined selection criteria.

21. A method for providing a client with an object to be rendered to a user, said method being implemented on a server coupled to the client by a communications link, the server being capable of accessing objects in a data store, said method comprising the steps of:

receiving an object request from the client;

downloading a graphical user interface to the client in response to receiving the object request, the graphical user interface comprising a set of automatically executing instructions for requesting a scaling preference from a user of the client, receiving a response from the user, and transmitting the user response to the server;

receiving a user-entered scaling preference from the graphical user interface;

retrieving the requested object from the data store;

scaling the retrieved object based on a predetermined selection criterion in accordance with the received user-entered scaling preference; and transmitting the scaled object to the client.

22. The method of claim 21, wherein said scaling step comprises scaling the retrieved object based on a characteristic of the retrieved object.

23. The method of claim 21, wherein said scaling step comprises scaling the retrieved object based on a characteristic of the server.

24. The method of claim 21, wherein said scaling step comprises scaling the retrieved object based on a characteristic of the client.

25. The method of claim 21, wherein said scaling step comprises scaling the retrieved object based on a characteristic of the communications link coupling the server and the client.

26. The method of claim 21, wherein the server includes a memory capable of storing one or more representations of an object, said retrieving step comprising attempting to retrieve a version of an object from the memory and, if not found therein, retrieving the requested object from the data store.

27. The method of claim 26, wherein the client is configured to render a different version of an object previously transmitted by the server, said method further comprising the steps of:

analyzing a request from the client to identify a requested version of an object and a current version of the object; and transmitting the requested version of the object to the client as a differential between the current version and the requested version.

28. The method of claim 26, further comprising the step of generating one or more versions of an object in a background mode of the server, and storing the one or more versions in the memory.

29. The method of claim 21, wherein at least two of said steps of retrieving the requested object, scaling the retrieved object and transmitting the scaled object proceed concurrently in a stream-based manner.

30. A set of instructions resident on a storage medium for execution by a server, said set of instructions enabling the server to provide a client coupled thereto with an encoded version of an object for display to a user, said set of instructions comprising instructions for:

receiving an object request from the client;

downloading a graphical user interface to the client in response to receiving the object request, the graphical user interface comprising a set of automatically executing instructions for requesting a scaling preference from a user of the client, receiving a response from the user, and transmitting the user response to the server;

receiving a user-entered scaling preference from the graphical user interface;

retrieving the requested object;

scaling the retrieved object based on a predetermined selection criterion in accordance with the received user-entered scaling preference; and transmitting the scaled object to the client.

31. The set of instructions of claim 30, wherein the server is coupled to a memory, said set of instructions further comprising instructions for maintaining one or more representations of an object in the memory.

32. The set of instructions of claim 30, wherein the storage medium comprises a portable magnetic storage device.

33. The set of instructions of claim 30, wherein the storage medium comprises a memory installed in a computer.

* * * * *

UNITED STATES PATENT AND TRADEMARK OFFICE
CERTIFICATE OF CORRECTION

PATENT NO. : 6,185,625 B1
DATED : February 6, 2001
INVENTOR(S) : Michael Man-Hak Tso et al.

It is certified that error appears in the above-identified patent and that said Letters Patent is hereby corrected as shown below:

<u>Title page,</u>
Item [75], Inventors, please change the last inventor's first name from "Seshardi" to -- Seshadri --.

Signed and Sealed this

Twenty-ninth Day of January, 2002

Attest:

Attesting Officer

JAMES E. ROGAN
*Director of the United States Patent and Trademark Office*